United States Patent
Kaneko et al.

[11] Patent Number: 5,721,984
[45] Date of Patent: Feb. 24, 1998

[54] CAMERA HAVING A BUILT-IN STROBE DEVICE

[75] Inventors: Hidefumi Kaneko, Tokyo; Masaaki Haga, Toky, both of Japan

[73] Assignee: Asahi Kogaku Kogyo Kabushiki Kaisha, Tokyo, Japan

[21] Appl. No.: 820,031

[22] Filed: Mar. 19, 1997

Related U.S. Application Data

[63] Continuation of Ser. No. 694,454, Aug. 12, 1996, abandoned.

[30] Foreign Application Priority Data

Aug. 15, 1995 [JP] Japan ............................. 7-208185

[51] Int. Cl.⁶ ......................................... G03B 15/05
[52] U.S. Cl. ..................................... 396/177
[58] Field of Search ............................. 396/174, 175, 396/176, 177, 178, 354

[56] References Cited

U.S. PATENT DOCUMENTS

| | | |
|---|---|---|
| 4,350,420 | 9/1982 | Engelsmann et al. |
| 4,893,140 | 1/1990 | Yamamoto et al. |
| 4,910,542 | 3/1990 | Yamamoto et al. |
| 4,920,368 | 4/1990 | Arai et al. |
| 5,028,949 | 7/1991 | Kawano |
| 5,036,345 | 7/1991 | Kawano |
| 5,055,866 | 10/1991 | Takebayashi |
| 5,065,177 | 11/1991 | Yamamoto et al. |
| 5,066,967 | 11/1991 | Yamamoto et al. |
| 5,079,574 | 1/1992 | Ueno |
| 5,122,829 | 6/1992 | Takami |
| 5,134,433 | 7/1992 | Takami et al. |
| 5,142,465 | 8/1992 | Sato |
| 5,233,378 | 8/1993 | Hosokawa et al. |
| 5,245,374 | 9/1993 | Hosokawa et al. |
| 5,270,757 | 12/1993 | Tosaka et al. ............ 396/177 |
| 5,287,135 | 2/1994 | Arai et al. |
| 5,329,327 | 7/1994 | Arai et al. |
| 5,384,612 | 1/1995 | Kaihara et al. ............ 396/177 |
| 5,506,645 | 4/1996 | Kaihara et al. ............ 396/177 |
| 5,565,941 | 10/1996 | Kaneko ....................... 396/177 |

FOREIGN PATENT DOCUMENTS

| | | |
|---|---|---|
| 58-208735 | 12/1983 | Japan |
| 2106261 | 4/1983 | United Kingdom |

OTHER PUBLICATIONS

English Language Abstract of JP 58-208735.

*Primary Examiner*—A. A. Mathews
*Attorney, Agent, or Firm*—Greenblum & Bernstein, P.L.C.

[57] ABSTRACT

A camera having a built-in strobe includes a strobe device which moves between a retracted position and a light emitting position. A pivot device supports the strobe device. A moving device moves the strobe device from the retracted position to the light emitting position. A locking device locks the strobe device when the strobe device is at the retracted position. A locking release device is positioned in a vicinity of one end of the pivot device along an extended axis of the pivot device. When the locking release device is moved towards the pivot device along the extended axis of the pivot device the strobe device is unlocked.

20 Claims, 5 Drawing Sheets

CAMERA HAVING A BUILT-IN STROBE DEVICE

This application is a continuation of application Ser. No. 08/694,454, filed Aug. 12, 1996, now abandoned.

BACKGROUND OF THE INVENTION

1. Field of the Invention

The present invention relates to a camera having a retractable built-in strobe device provided on an upper portion of the camera.

2. Description of the Related Art

Recently, many cameras have been produced having a retractable built-in strobe device (hereinafter strobe device) provided on an upper portion of the camera. In such cameras, the strobe device is rotatably supported by the camera via a rotative shaft or pivot. With such an arrangement, the strobe device is capable of moving in an upwards ("pop up") direction and in a downwards (retracting) direction. The rotative shaft or pivot is positioned horizontally, perpendicular to an optical axis of a photographing lens of the camera.

FIG. 6 illustrates a conventional camera 1 having a built-in strobe device 2 positioned on an upper portion of the camera 1. A locking release member 3 is provided, positioned away from a pivot line 4 of the strobe device 2. The locking release member 3 serves as a controller, so that the strobe device 2 can move from the retracted (stored) position (as shown in FIG. 6) to a pop-up (extended, not shown) position. When at the pop-up position, the strobe device 2 is in a state capable of flashing.

However, if the locking release member 3 is positioned away from the pivot line 4 of the strobe device, a photographer who is unfamiliar with the camera 1 might not recognize that the locking release member 3 is the controller to set the strobe ready for strobe photography. Therefore, the position of the locking release member 3 should be modified to improve the operability of the camera.

Further, in order to move the built-in strobe device from the retracted position to the pop-up position, a coil spring or the like is often provided at one end of the locking release member. Generally, such a built-in strobe device is maintained in the retracted state by a locking device (locking release member). However, if the locking device is positioned toward the opposite horizontal side of the pivot of the coil spring, when the camera is viewed from the front in a retracted state, there is a possibility that a gap between the built-in strobe device and the upper portion of the camera is wider at the end at which the coil spring is provided. This spoils the appearance of the camera.

The force applied to move the strobe device from the retracted position to the pop-up position is often stronger than the force that is usually required in normal photographing conditions. The reason for this is because when the camera is used at low temperatures, the lead wires of the bulb of the built-in strobe device stiffen. In order to move the strobe device in such low temperature conditions, a stronger coil spring or the like is selected for use. However, when the strobe device is used under normal conditions, the strobe device may heavily collide with a stopper, causing an unwanted noise. In addition, such a heavy collision may result in damage to the strobe device.

SUMMARY OF THE INVENTION

It is an object of the present invention to provide a camera including a built-in (pop-up) strobe having an easily operable locking release member, and in which the position of the locking release member can be easily perceived by a photographer, regardless of the photographer's knowledge of the camera.

To achieve the object mentioned above, according to an aspect of the present invention, a camera having a built-in strobe is provided including a strobe device which moves between a retracted position and a light emitting position. A pivot device supports the strobe device. A moving device moves the strobe device from the retracted position to the light emitting position. A locking device locks the strobe device when the strobe device is at the retracted position. A locking release device is positioned in a vicinity of one end of the pivot device along an extended axis of the pivot device. When the locking release device is moved towards the pivot device along the extended axis of the pivot device the strobe device is unlocked.

The pivot device preferably consists of a first shaft and a second shaft.

The locking device is preferably positioned on a body of the camera alongside a side surface of the strobe device when the strobe device is at the retracted position.

Preferably, the locking release device and the first shaft are positioned having a predetermined space therebetween.

The locking device preferably includes an arm capable of swinging in a horizontal direction parallel to a longitudinal direction of the camera body. A locking pawl is formed at one end of the arm. A release portion is formed at another end of the arm. The release portion is positioned in the space provided between the locking release device and the first shaft. A locking bore (or notch) is formed on the strobe device. The locking pawl engages with the locking notch when the strobe device is at the retracted position.

Preferably, when the locking release device is depressed a position of the release portion is shifted and the locking pawl is detached from the locking notch so that the strobe device is unlocked. The locking release device is preferably fitted so to be incapable of rotating relative to the strobe device.

The moving device preferably consists of a spring which applies a force to extend the strobe device to the light emitting position.

A pentaprism and a bulged (or protruding) portion, formed on an upper part of the camera body, are also preferably provided. The protruding portion covers an upper part of the pentaprism. The strobe device is positioned on the protruding portion. The first and second shafts penetrate through side walls of the protruding portion. The spring is provided on one of the first and second shafts inside the protruding portion.

The locking device and the locking release device are preferably both provided on a side of one of the first and second shafts having the spring.

According to another aspect of the present invention, a camera having a built-in strobe is provided having a first shaft and a second shaft opposed to the first shaft. A retractable strobe device is provided on an upper portion of the camera. The strobe device is rotatively supported by the camera through the and first and second shafts. A locking device locks the strobe device when the strobe device is retracted. A locking release device is positioned proximal to one end of the first shaft along an axis which includes the first and second shafts. When the locking release device is depressed in a direction towards the first shaft, the strobe device is unlocked.

The present disclosure relates to subject matter contained in Japanese Patent Application No. 07-208185 (filed on Aug. 15, 1995) which is expressly incorporated herein by reference in its entirety.

BRIEF DESCRIPTION OF THE DRAWINGS

The above object, features, and advantages of the present invention will be described in greater detail with reference to the accompanying drawings, in which like members are indicated by like reference numerals, and wherein.

DESCRIPTION OF THE PREFERRED EMBODIMENT

The present invention will now be described below in greater detail, with specific reference to the accompanying drawings.

Figure 2:
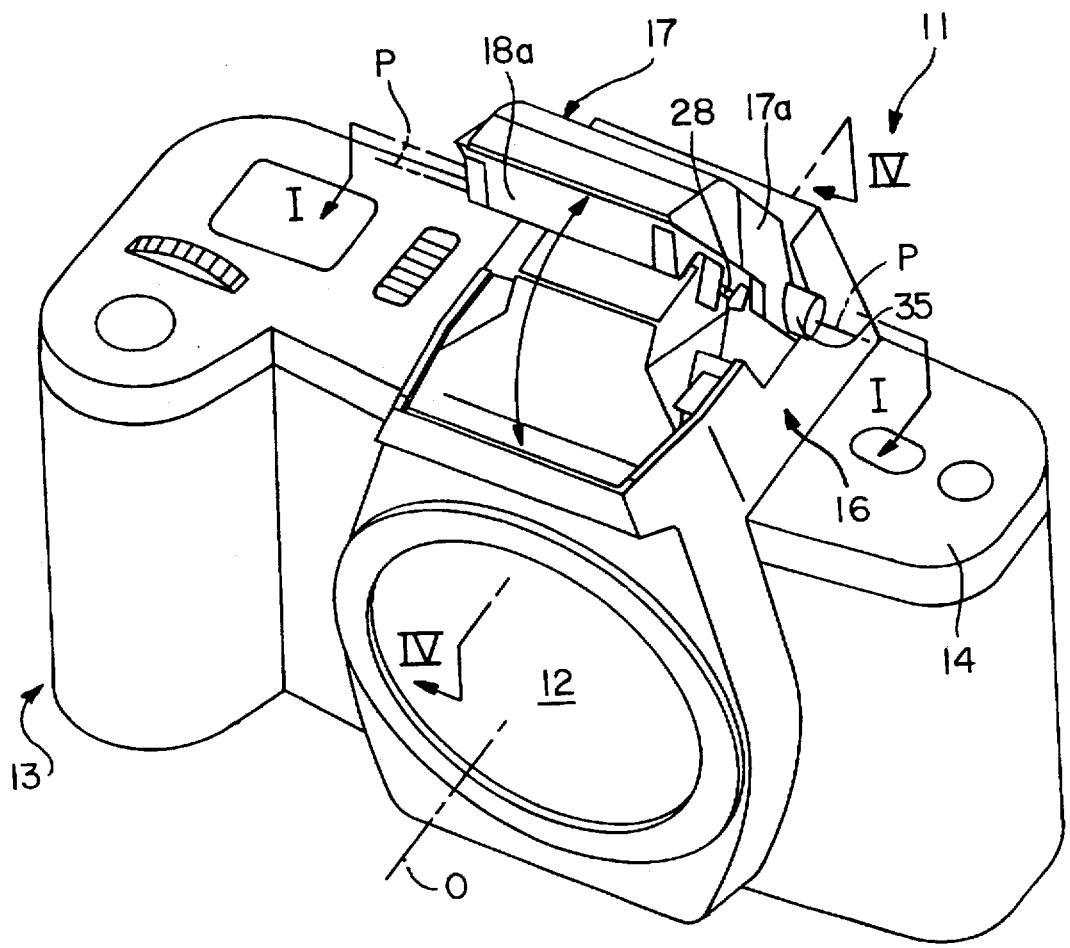
FIG. 2 is a schematic perspective view of the camera having a built-in strobe according to the present invention.

FIG. 2 illustrates an overall construction of a camera having a built-in strobe (hereinafter referred to as simply "a camera") according to an embodiment of the present invention.

A camera 11 is provided having a camera body 13. A photographic aperture 12 is provided at substantially a center of a front surface of the camera body 13, as viewed in FIG. 2. A photographic lens (not shown) is mounted to the photographic aperture 12. An upper portion 14 is provided on an upper part of the camera body 13.

Figure 4:
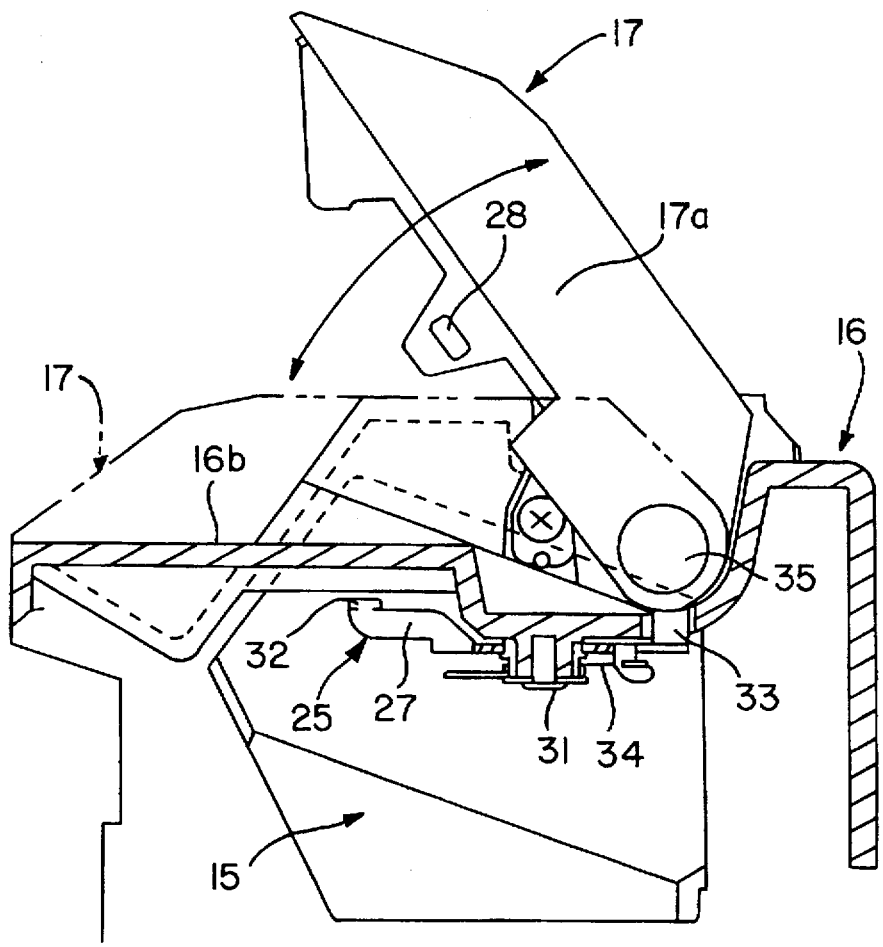
FIG. 4 is a longitudinal sectional view taken along the line IV—IV of FIG. 2.

As illustrated in FIG. 4, a pentagonal roof prism 15 (hereinafter referred to as "a pentaprism") is provided on an upper part of the camera body 13. The pentaprism 15 is positioned such as to correspond to an unillustrated focusing glass. A protruding portion 16 is formed on the upper portion 14 of the camera body 13. The protruding portion 16 covers an upper part of the pentaprism 15.

Figure 3:
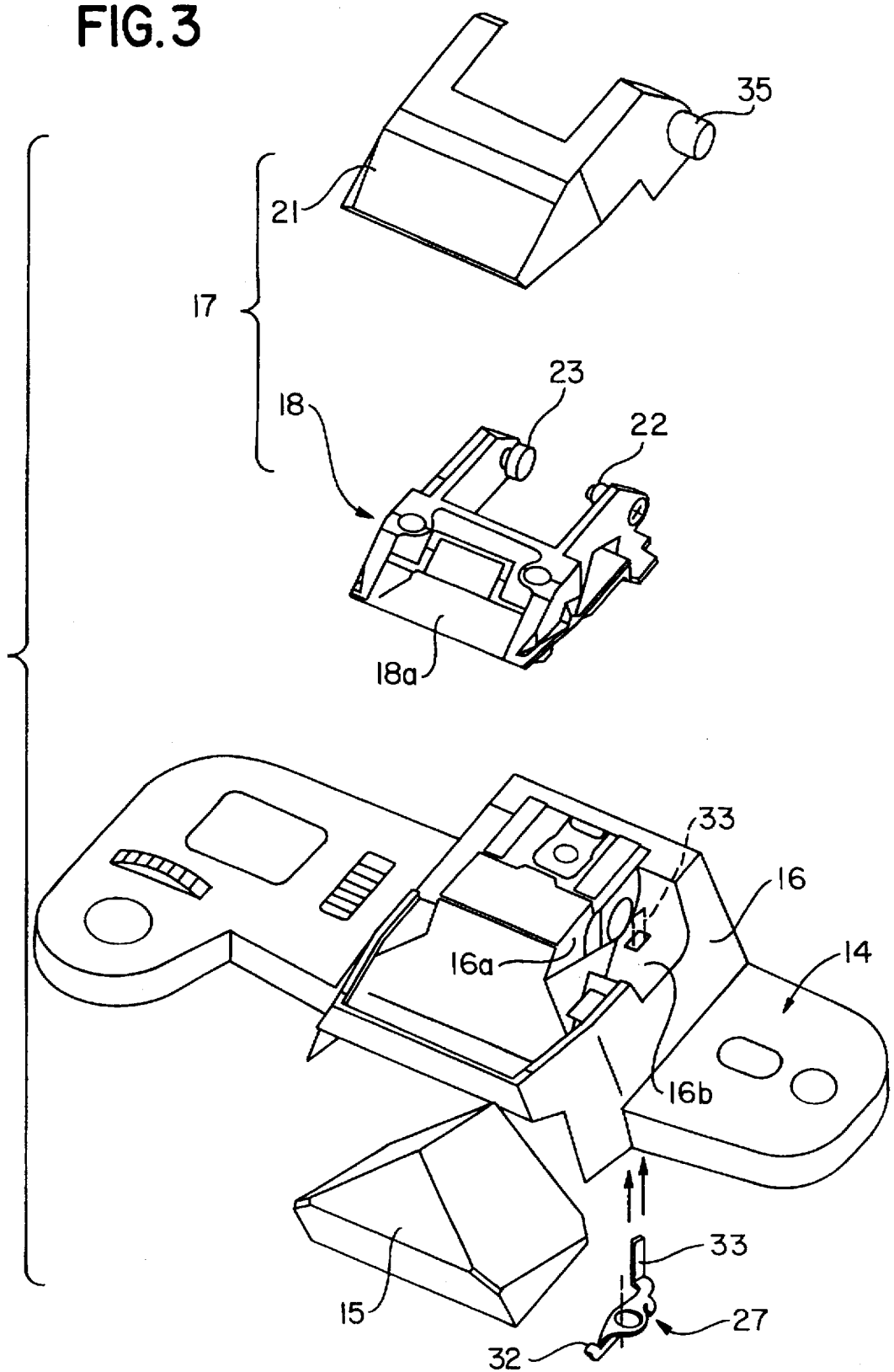
FIG. 3 is an exploded perspective view of a strobe assembly and an upper portion of the camera shown in FIG. 2.

As shown in FIG. 3, a strobe device 17 is positioned on an upper surface of the protruding portion 16. The strobe device 17 consists of a strobe assembly 18 and a strobe cover 21. The strobe assembly 18 is provided with a xenon lamp, a reflective umbrella (both not shown) and a Fresnel lens 18a. When the strobe device 17 is in a retracted (stored) state, the strobe cover 21 and the upper portion 14 form an outline of the upper part of the camera body 13.

Figure 1:
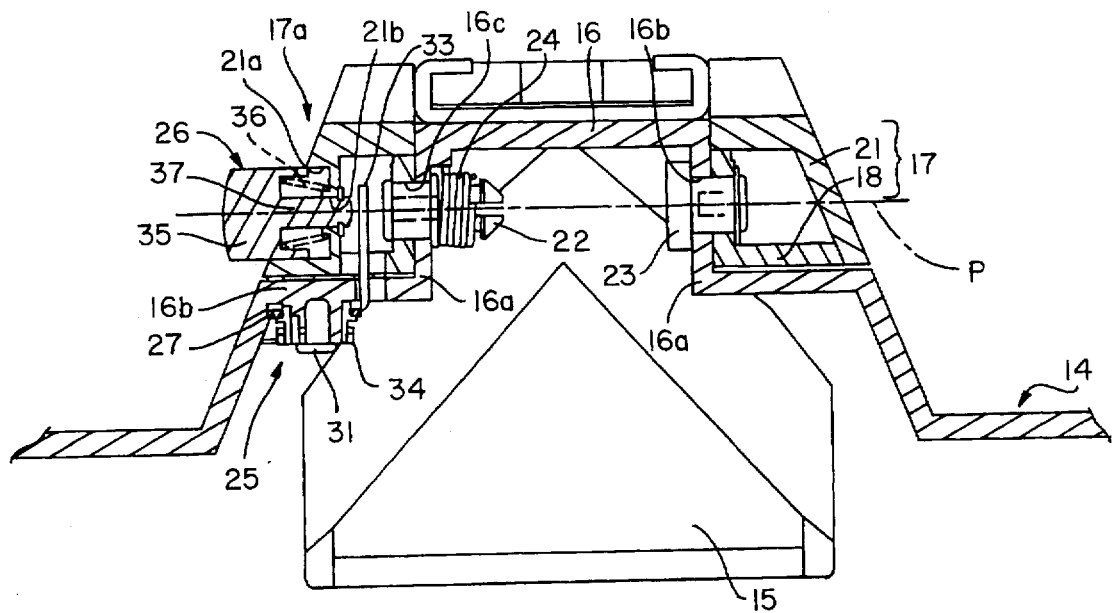
FIG. 1 is a cross-sectional view taken along the line I—I of FIG. 2, of a camera having a built-in strobe according to the present invention.

As illustrated in FIG. 1, a first shaft 22 and a second shaft 23 extend through side walls 16a of the protruding portion 14. The first and second shafts 22, 23 support the strobe device 17.

The first and second shafts 22, 23 are positioned laterally along a pivot line P. The pivot line P is a horizontal line perpendicular to the direction of an optical axis O of the photographic lens.

Figure 5:
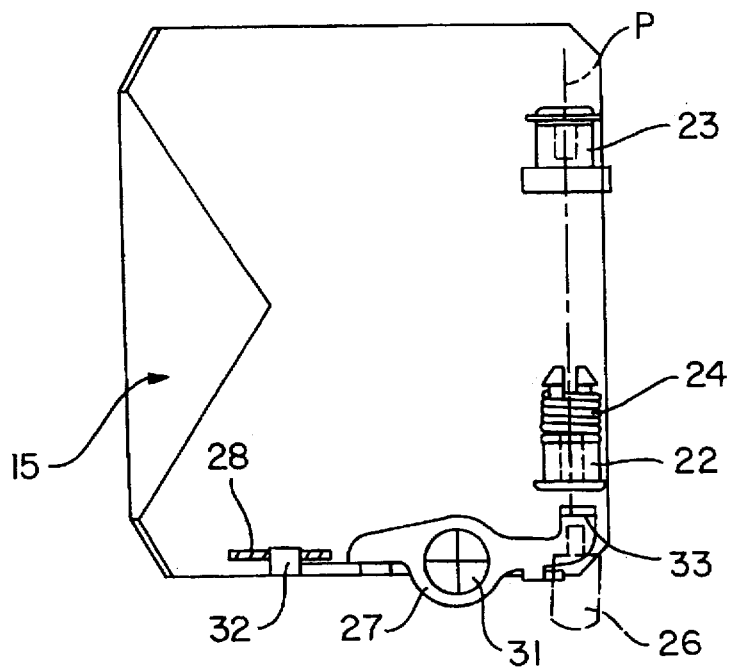
FIG. 5 is a plan view illustrating a relationship between a first shaft, a second shaft and a swinging arm for locking.
Figure 6:
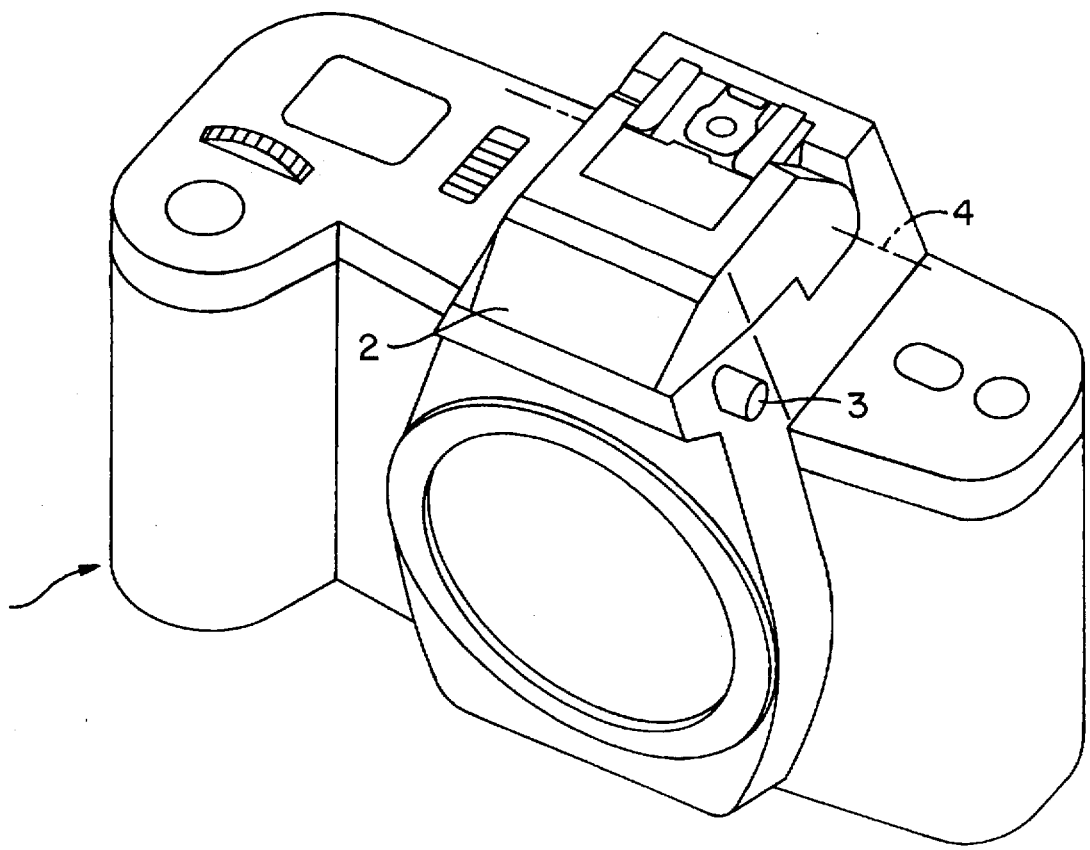
FIG. 6 is a schematic perspective view illustrating a position of a locking release member in a conventional camera having a built-in strobe.

FIG. 5 is a plan view showing a relationship between the first and second shafts 22, 23 and the pivot line P. The first shaft 22 and the second shaft 23 are positioned away from each other, with the pentaprism 15 being positioned therebetween. Each shaft 22, 23 is rotatively supported (through their pivots) by respective pivot bores 16c. The pivot bores 16c (as shown in FIG. 1) are formed on the side walls 16a. The shafts 22, 23 serve as a single pivot for the strobe device 17. As shown in FIG. 4, the strobe device 17 is capable of moving upwardly and downwardly through rotation around the shafts 22, 23. Namely, the strobe device 17 can move between the retracted position (illustrated by a phantom line in FIG. 4) and an extended (pop-up) position (illustrated by a solid line in FIG. 4). When in the extended position the strobe device 17 is ready for operation.

The first and second shafts 22, 23 are fixed to the strobe assembly 18, and rotation of the shafts 22, 23 relative to the strobe assembly 18 is prevented. A coil spring 24 is fitted on the portion of the first shaft 22 which projects inside the side wall 16a. An elastic force of the coil spring 24 is exerted between the side wall 16a and the first shaft 22, while a rotational force (force of extension) of the coil spring 24 is applied to the strobe device 17 in the direction of extension.

On the first shaft 22 side of the strobe device 17 (the left side as viewed in FIG. 1), the strobe device 17 is further provided with a locking device 25 and a locking release device 26. The locking device 25 and the locking release device 26 are positioned between a rim 17a and a rim receiving section 16b of the protruding portion 16. As shown in FIG. 4, the rim receiving section 16b corresponds to the rim 17a. The locking device 25 maintains the strobe device 17 in the retracted position. The locking release device 26 releases the hold of the locking device 25, so that the strobe device 17 can move to the pop-up position.

Positioned inside the protruding portion 16, the locking device 25 is provided with a swinging arm 27 for locking. The locking device 25 is also provided with a locking notch 28 formed on the strobe assembly 18, as shown in FIG. 4.

The swinging arm 27 is supported by a pin 31 on the bottom surface of the protruding portion 16. The swinging arm 27 is capable of swinging in a horizontal direction (plane), i.e., in the longitudinal direction of the camera 11. As illustrated in FIG. 5, a locking pawl 32 is provided at one end of the swinging arm 27. A release portion 33 is provided at the other end of the swinging arm 27. The release portion 33 is operated by the locking release device 26 (described in detail below). A coil spring 34 is fitted on the swinging arm 27 for locking. An elastic force of the coil spring 34 is applied to the swinging arm 27 so that the locking pawl 32 of the swinging arm 27 is moved rotatively towards the pentaprism 15.

The locking notch 28 is formed on the strobe assembly 18 having such a shape that when the strobe device 17 is in the retracted state, the position of the locking notch 28 corresponds to the position of the locking pawl 32 of the swinging arm 27 for locking, so that the locking notch 28 and the locking pawl 32 can engage with each other. When the strobe device 17 moves to the retracted position, the locking pawl 32 enters and engages with the locking notch 28 due to the force of the coil spring 34. Accordingly, the strobe device 17 is maintained in the retracted state.

The function of the locking release device 26 will now be described.

For the purpose of locking, the release portion 33 is formed on the swinging arm 27 having such a shape that the release portion 33 is elongated upwardly from one end of the swinging arm 27. The release portion 33 penetrates through the upper portion 14 of the protruding portion 16, and reaches a position outside the outer end of the first shaft 22, namely the position on the left of the first shaft 22, as viewed in FIG. 1.

A release operation button 35 is provided on the left side of the strobe cover 21, as viewed in FIG. 1. The release operation button 35 is positioned substantially coaxially along the pivot line P, which runs through the center of the first and second shafts 22, 23.

The first shaft 22 and the release operation button 35 are positioned having a predetermined space therebetween. The release portion 33 is positioned in the space between the first shaft 22 and the release operation button 35. The release portion 33 extends to a position which intersects the pivot line P. The release portion 33 is formed to be capable of being shifted rearwardly, namely towards the first shaft 22. The rearward movement of the release portion 33 is effected through a depression of the release operation button 35 (described in detail below).

In the present invention, the release operation button 35 may correspond to a locking release member. A recess 21a is formed on the strobe cover 21 of the strobe device 17. The release operation button 35 is mounted so as to be retractable into the recess 21a via a spring 36. The release operation button 35 is mounted to the strobe cover 21 via a key (not shown), for example. When the release operation button 35 is depressed, the release operation is performed, namely the release operation button 35 is moved in the direction along the pivot line P towards the first shaft 22. Although the release operation button 35 can move in the direction along the pivot line P, the release operation button 35 cannot rotate.

As shown in FIG. 1, an operating member 37 is provided inside the release operation button 35, at substantially a center of the release operation button. The operating member 37 penetrates through a penetration bore 21b, provided inside the strobe cover 21. When the release operation button 35 is operated to be released, the operating member 37 depresses the release portion 33 of the swinging arm 27, i.e., in the direction towards the first shaft 22. Subsequently, the swinging arm 27 is swung and the position of the swinging arm 27 is shifted. Then the locking pawl 32 moves rearwardly away from the locking notch 28, until the locking pawl 32 is disengaged from the locking notch 28. Accordingly, the strobe device 17, to which the force of coil spring 24 is applied, rotates from the retracted position to the pop-up position, ready for operation.

In the present invention, the release operation button 35 is positioned in close proximity (e.g., substantially coaxially) to the first shaft 22, and the release operation of the locking device 25 by the release operation button 35 is made in the direction of the pivot line P. Therefore, even a photographer who is unfamiliar with the camera, may easily recognize the position of the release operation button 35, thus improving the operability of the camera.

Since the structures of the locking device 25 and the locking release device 26 of the present embodiment are relatively simple, the locking device 25 and the locking release device 26 can be made compact.

The coil spring 24 is positioned so that the force of extension is applied to the strobe device 17. In the present invention, since the coil spring 24 is positioned in the space inside the protruding portion 16 on the first shaft 22, the size of the strobe device 17 can be minimized.

The first and second shafts 22, 23 serve as the pivots in order to retract or pop-up the strobe device 17, and the coil spring 24, the locking device 25 and the locking release device 26 are positioned only at the side of the first shaft 22. With such an arrangement, when the force of the coil spring 24 is applied to the strobe device 17, a smaller moment is effected in the direction of the first and second shafts 22, 23. Accordingly, during the retracted state, an unevenness in the width of the gap between the strobe device 17 and the upper portion 14 of the camera body 13, along the pivot line P, can be prevented. Therefore, the appearance of the camera can be improved.

Further in the present embodiment, the release operation button 35 is provided on the strobe cover 21 and is incapable of being rotated. Due to this structure, when the strobe device 17 extends or pops-up by means of a depression of the release operation button 35 by a photographer's finger, the friction between the release operation button 35 and the finger serves as a brake, thus reducing the collision impact between the strobe device 17 and a stopper. Therefore, unwanted noise caused due to the collision between the strobe device 17 and the stopper can be reduced.

As described above, in the camera having a built-in strobe according to the present embodiment of the present invention, a locking release member is positioned outside of one end of a shaft along an extended line of the shaft, and locking of the strobe device, by a locking device, is released by a locking release member. The release operation of the locking device by the locking release member is made in the direction of the pivot line. Therefore, even a photographer who is unfamiliar with the camera, may easily recognize the position of the locking release member, thus improving the operability of the camera.

Although the present invention has been described with reference to particular means and materials, it is to be understood that the invention is not limited to the particulars disclosed and extends to all equivalents within the scope of the claims.

What is claimed is:

1. A camera having a built-in strobe, comprising:
    a strobe device which moves between a retracted position and a light emitting position;
    pivot means for supporting said strobe device;
    means for moving said strobe device from said retracted position to said light emitting position;
    locking means for locking said strobe device when said strobe device is at said retracted position; and
    locking release means positioned in a vicinity of one end of said pivot means along an extended axis of said pivot means,
    wherein said strobe device is unlocked when said locking release means is moved towards said pivot means along said extended axis of said pivot means.

2. The camera according to claim 1, wherein said pivot means comprises a first shaft and a second shaft, said first shaft opposing said second shaft.

3. The camera according to claim 2, wherein said locking means is positioned on a body of said camera alongside a side surface of said strobe device when said strobe device is at said retracted position.

4. The camera according to claim 3, wherein said locking release means and said first shaft are positioned having a predetermined space therebetween.

5. The camera according to claim 4, wherein said locking means comprises:
    an arm capable of swinging in a horizontal direction about an axis perpendicular to said extended axis of said pivot means;

a locking pawl formed at one end of said arm;

a release portion formed at another end of said arm, said release portion being positioned in said space between said locking release means and said first shaft; and a locking notch formed on said strobe device, wherein said locking pawl engages with said locking notch when said strobe device is at said retracted position.

6. The camera according to claim 5, wherein when said locking release means is depressed, a position of said release portion is shifted and said locking pawl is detached from said locking notch so that said strobe device is unlocked.

7. The camera according to claim 6, wherein said locking release means is incapable of rotating relative to said strobe device.

8. The camera according to claim 2, wherein said moving means comprises a spring which applies a force to extend said strobe device to said light emitting position.

9. The camera according to claim 8 further comprising:

a pentaprism; and a protruding portion formed on an upper part of said camera body, said protruding portion covering an upper part of said pentaprism, said strobe device being positioned on said protruding portion, wherein said first shaft and said second shaft extends through side walls of said protruding portion, and further wherein said spring is provided on one of said first shaft and said second shaft inside said protruding portion.

10. The camera according to claim 9, wherein said locking means and said locking release means are both provided on the same side of one of said first and second shafts as said spring.

11. A camera having a built-in strobe, comprising:

a first shaft;

a second shaft coaxial with and opposing said first shaft;

a retractable strobe device provided on an upper portion of said camera, said strobe device being rotatively supported by said camera by said first shaft and said second shaft;

locking means for locking said strobe device when said strobe device is retracted; and locking release means positioned in proximal to one end of said pivot means along an axis which includes said first shaft and said second shaft, wherein said strobe device is unlocked when said locking release means is depressed in a direction towards said first shaft.

12. The camera according to claim 11, said locking release means comprising a release operation button, wherein a pivot line of said first shaft and said second shaft intersects a portion of said release operation button.

13. A camera having a built-in strobe, comprising:

a strobe device movable between a retracted position and a light emitting position;

a pivot supporting said strobe to move between said retracted position and said light emitting position, said pivot having a pivot axis;

a pop-up mechanism that moves said strobe device between said retracted position and said light emitting position;

a lock, associated with said strobe device, that holds said strobe device in said retracted position;

a lock release mechanism in a vicinity of one end of said pivot along said pivot axis, said lock release mechanism operating said lock to release said strobe device to move between said retracted position and said light emitting position when a portion of said lock release mechanism is moved in a direction along said axis of said pivot.

14. The camera according to claim 13, said pivot comprising a first shaft and a second shaft, said first shaft opposing said second shaft.

15. The camera according to claim 14, wherein said lock is positioned on a body of said camera at a position that is alongside a side surface of said strobe device when said strobe device is at said retracted position.

16. The camera according to claim 15, wherein said lock release mechanism and said first shaft are separated by a predetermined space.

17. The camera according to claim 16, said lock comprising:

an arm swingable in a horizontal direction about an arm axis perpendicular to said pivot axis;

a locking pawl formed at one end of said arm;

a release portion formed at another end of said arm, said release portion being positioned between said lock release mechanism and said first shaft; and a locking notch formed on said strobe device, said locking pawl engaging with said locking notch when said strobe device is in said retracted position wherein said release portion is shifted and said locking pawl detached from said locking notch, thereby releasing said strobe device, in response to a depressing of said locking release mechanism.

18. The camera according to claim 13, wherein said lock release mechanism is incapable of rotating relative to said strobe device.

19. The camera according to claim 14, further comprising:

a pentaprism;

a protruding portion formed on an upper part of a body of said camera, said protruding portion covering an upper part of said pentaprism, and said strobe device being supported by said protruding portion, said first shaft and said second shaft extending through side walls of said protruding portion; and a spring that applies a force to extend said strobe device to said light emitting position, surrounding one of said first shaft and said second shaft within said protruding portion.

20. The camera according to claim 13, said lock release mechanism comprising a release operation button, wherein a pivot line of said first shaft and said second shaft intersects a portion of said release operation button.

* * * * *